United States Patent Office

2,916,855
Patented Dec. 15, 1959

2,916,855

TREATMENT OF SOIL BY FUMIGANT AND FOAM

Bernard J. Thiegs, Midland, Mich., assignor to The Dow Chemical Company, Midland, Mich., a corporation of Delaware No Drawing. Application October 10, 1958
Serial No. 766,417

20 Claims. (Cl. 47—58)

The present invention contributes to the agricultural arts and relates, in particular, to an improved and novel method for fumigating or otherwise treating the soil with suitable volatile or fugacious materials to destroy undesirable plant or insect or other life or for other purposes. More particularly, this invention relates to a method for confining volatile fumigant materials within the soil during or after their application to and release in the soil by means of a layer or blanket of stable foam on the surface of the ground that has been spumed from an aqueous, foam-providing composition.

The present application is a continuation-in-part of the copending application for United States Letters Patent having Serial No. 635,619 which was filed on January 23, 1957, now abandoned.

It is a known technique to release volatile fumigant materials (such as methyl bromide and the like) under a plastic or heavy paper tarpaulin or cover or the like which is spread over the ground to be fumigated and is tightly sealed to prevent escape of the fumigant. Such permanently fabricated covers, however, are relatively expensive and may be somewhat awkward and difficult to handle during the fumigating operation. Furthermore, after the fumigation of a given plot of soil has been accomplished under a permanent sheet-like confining cover, the cover must ordinarily be removed in order to permit any use to be made of the fumigated soil.

It would be an advantage, and it is among the principal purposes of the present invention, to provide a novel and improved method for confining volatile materials within the soil during fumigating and the like or analogous treatments which would not be subject to the drawbacks and deficiencies of conventionally employed techniques.

This desideratum and other advantageous benefits may be accomplished by the practice of a method or technique in accordance with the present invention which comprises employing, as a blanket for the soil that is to be fumigated (or otherwise treated with a volatile or fugacious substance), a covering layer of a stable, longeval or long-lasting foam that has been generated from an aqueous, foam-providing composition which covers and confines the volatile fumigant or other soil treating substance thereunder. The foam blanket may be initially applied to the soil being fumigated before the volatile fumigant or treating agent is released into the soil under the covering and confining blanket. Alternatively, and in many instances with great advantage, the fumigant may first be injected or released into the soil, then followed by application thereover of the covering, blanketing layer of foam for confining and effectively containing the fumigant within the soil.

The foam blanket that has been applied over the soil, either after release of the fumigant or treating agent into the soil or through which the fumigant or other material may be injected into the soil at suitable intervals therethrough, effectively confines the volatile fumigant substance within the soil for a sufficient period of time to prevent its escape and to permit it to accomplish its intended function. The confining efficiency of the foam blanket is commensurate with that realized with the conventional plastic film, paper and equivalent sheet-like coverings that have heretofore been employed for the presently contemplated purposes. Furthermore, the confining foam blanket is at least as economical as the conventional already fabricated and permanent sheet-like covers and is generally more easily applied as a confining layer over the surface of given areas of soil than are the ordinary covers. In addition, the eventual natural decay and dissipation of the foam blanket precludes and obviates the necessity of taking any steps for its removal in order to allow use of the soil. It can even be simply washed away or into the ground in the event that it is not desired to wait for the normal failure of the foam to persist.

When the present invention is practiced so as to first apply the foam blanket cover over the soil prior to release of the fumigant or other volatile soil treating substances through the foam and into the soil, it is relatively immaterial how quickly the fumigant is released into the soil after application of the foam; provided, of course, that release of the fumigant through the foam blanket is accomplished during the useful life of the foam and sufficiently before its failure to permit enough time for the volatile treating agent to accomplish its intended function under the confining foam blanket.

When the invention is practiced by applying the foam blanket cover over the soil after release of the fumigant or other volatile treating substances thereinto, the permissible time delay between release of the fumigant and application of the foam depends to a great extent upon the volatility of the particular treating substance or agent being employed for the soil. It also depends, as is apparent, upon the depth or actual point of release of a given fumigant or other treating agent in the soil, taking into account and anticipating the time that may be required after release, under all the conditions of treatment, for the fugacious material to negotiate to the surface of the soil and escape therefrom. It is necessary, in any event, for the foam blanket to be applied quickly enough so that substantial and effective portions of the volatile treating agent are retained and confined in the soil by the blanketing action of the foam. In most cases, particularly when relatively volatile materials are being handled, it is preferable to apply the foam blanket immediately after release of the fumigant into the soil. Thus, when a relatively volatile substance (such as methyl bromide) is being utilized, it is usually necessary to apply the confining foam blanket almost simultaneously with release of the treating agent in order to secure the desired results. With such highly fugacious materials, it is generally advisable to wait no more than 5 to 10–15 minutes after release of the fumigant before covering of the soil with the foam. However, when relatively less volatile fumigants or other treating substances (such as propargyl bromide) are being employed, a greater delay between release of the treating substance and application of the foam is permissible. Thus, with propargyl bromide and treating substances having equivalent relatively lower volatilities, satisfactory results may be achieved when the foam blanket is applied as long as an hour or more after release of the less volatile treating substance into the soil.

In general, when the foam blanket is applied after release of the fumigant into the soil, it is desirable to make application of the foam within about four hours after application of the treating agent. Usually, the best results are obtained when the foam blanket is applied within an hour or so after release of the treating agent.

And, as indicated, optimum and most efficient results, especially with highly volatile fumigants, are achieved when the foam is applied immediately after release of the fumigant in the cases where such manner of operation is being practiced.

Any volatile fumigant substance or analogous volatile or fugacious soil treating or conditioning agent may be employed in the practice of the invention. Thus, soil under the foam blanket cover may be treated at conventional dosage rates with such materials as methyl bromide, ethylene dibromide, ethylene dichloride, chloropicrin, dichloropropenes, admixtures of dichloropropenes with dichloropropanes, 1,2-dibromo-3-chloropropane, carbon disulfide (also called carbon bisulfide), propargyl bromide, paradichlorobenzene and the like agents or mixtures thereof. The agent that is utilized need not have such fugacity or be of a type that may require its total and absolute positive confinement in the soil. As is apparent, its efficacy need only be augmented and its application benefited by confinement. Under certain circumstances and for some soils it may even be desirable and advantageous to confine ammonia in the practice of the invention.

Advantageously, the foam-providing composition and the foam generated therefrom for forming the confining blanket may comprise water and a minor proportion of a water-soluble polymeric or equivalent material that is mechanically spumiferous in aqueous solution to provide plenteous quantities of foam that may either inherently be relatively stable and long-lasting or which may be rendered so by the incorporation of one or more suitable foam stabilizing ingredients and addimants in the composition. Generally, it is necessary for the foam to remain in place for relatively long periods, oftentimes for as long as half-day periods or longer. Hence, the compositions that are employed must usually be adapted to provide stable foams that have a life (or life expectancy) of more than about one hour and, with greater advantage, of at least about four hours in outdoor exposure. It is frequently preferable to utilize foams that persist for at least eight to twelve hours. Several water-soluble polymeric materials, including various proteinous substances, are adapted to be utilized in and for compositions having the indicated desirable characteristics. It is of particular benefit, however, to employ foam-providing compositions to generate the plant protecting foams in the practice of the present invention which are in general accordance with the compositions that have been disclosed by Bernard J. Thiegs in his copending application for United States Letters Patent covering Stable Foam Compositions having Serial No. 634,196 which was filed on January 15, 1957.

Thus, it is highly advantageous to use the exceptionally stable and lasting foams that have been generated from spumescent aqueous compositions containing minor proportions of saponin and a long chain, water-soluble, non-proteinous polymeric material that is selected from the group consisting of non-polar cellulose ether derivatives that are adapted to provide one percent by weight aqueous solutions having surface tensions at room temperatures beneath about 60 dynes per centimeter; polyvinyl alcohol (including various of its hydrolyzed forms); polyvinylpyrrolidone; water-soluble copolymers of vinyl pyrrolidone; hydrolyzed polyacrylonitrile; copolymers of vinyl acetate and maleic acid; copolymers of vinyl methyl ether and maleic anhydride, and mixtures thereof. The cellulose ether derivatives that are employed may contain various alkyl or alkoxy etherifying substituents, or both in combination, that, advantageously, are not comprised of more than about four carbon atoms in their structures. As the term is conventionally employed by those who are skilled in the art, and as it is intended to be construed herein, non-polar cellulose ether derivatives are those which are substantially devoid of strong polar substituents and which are relatively non-polar in comparison to the cellulose ether derivatives that are usually considered to be relatively polar, such as the alkali metal salts of carboxy methyl cellulose and the like.

The expectable life of foam structures that have been generated from such spumescent compositions is invariably greater than one hour and generally more than about four hours. Quite often, it is found to be in excess of eight or twelve hours, especially when cellulose ether derivative or polyvinylalcohol compositions are employed. When a cellulose ether derivative is utilized, better results are generally obtained with low viscosity grades of the ether. Eminently satisfactory results may invariably be obtained when a methyl cellulose ether is employed that has an average molecular chain length of such an order of magnitude that the absolute viscosity of a two percent by weight aqueous solution of the ether at 20° C. is less than about 100 centipoises. Cellulose ether derivatives of the last-mentioned type are frequently considered and designated as being in the low viscosity range. They most often are found to have an average of between 1.5 and 2.0 methoxy groups per each recurring glucose unit in the cellulose molecule. Such a material may suitably be similar to that which is obtainable under the tradenames "Methocel" or "Methocel HG" from The Dow Chemical Company of Midland, Michigan.

In many cases, other foam-providing substances, including water-soluble proteinous substances, may also be employed suitably. Thus, protein-type foams that are prepared from gelatin, for example, and such compositions as may be typified by "3 percent liquid foam," a proteinous foam-generating material that is commercially available from The National Foam Company, may be utilized as may other foam-providing substances. Stable foams generated from soap and/or synthetic detergent compositions may also be employed with benefit in the practice of the present invention, as may other equivalent foam-providing compositions capable of being converted into foams having the indicated particulars and characteristics.

The concentration of the water-soluble polymer or other water-soluble foam-providing substance that is employed in the aqueous foam-providing compositions that are utilized in the practice of the invention may be varied to best suit the spuming characteristics and properties of the particular polymer or other substance that is involved. Generally, however, a water solution containing less than about 10 percent by weight of any foam-providing polymer or other substance will be found suitable for the intended purpose. Conventional and known amounts of various foam-stabilizing additaments may be incorporated in the compositions whenever their use is necessary or advantageous.

When saponin-containing compositions in accordance with the referred-to disclosure of Thiegs are employed, the concentration of the water-soluble polymer may, for example, be from about 0.25 to 5 percent by weight, based on the weight of the composition, and that of the saponin from about 0.05 to 10 percent by weight. Usually, however, spumiferous compositions and the foams generated therefrom that contain and are stabilized with saponin may be employed with the greatest efficacy when their content of the long-chain water-soluble, non-proteinous polymer is in the range from about 0.75 to 2 percent by weight, based on the weight of the composition, and an amount of the saponin in the range from about 0.1, preferably from about 0.25 to about 1 percent by weight is incorporated therein.

While the relative degree of stability of a foam that has been generated from a saponin stabilized composition depends to a great extent upon the relative proportion of saponin that is incorporated in the composition, a highly suitable ratio of the saponin to the long-chain, water-soluble polymeric material is frequently found to be in the neighborhood of 0.25 to 1 part by weight of the former for each part by weight of the latter that is employed in the composition, especially when the latter polymer is a methyl ether of cellulose. It is ordinarily desirable to employ a foam-providing composition that has an expansion potential when generated into foam of at least about 10, and, preferably, at least about 30 up to as much as 200 or more, times by volume by whatever spuming technique is employed. Obviously, more greatly expanded foam provides among other benefits the advantage of greater economy in use of the spumescent composition from which it is generated.

Various techniques may be employed for spuming the foam-providing compositions into the stable foams that are utilized as confining blankets on the surface of the soil to permit its treatment with a volatile substance in the practice of the present invention. It is generally preferable and most expedient to generate the foams by means of mechanical spuming techniques that are adapted to provide excellent, three-dimensional foam structures from the aqueous compositions. Thus, pneumatic or bubbling techniques may be employed with great suitability and practicality. In addition, aerosol dispensers and the like appliances wherein the foam-providing composition is discharged and bubbled under influence of a pressurized propellant gas may also be utilized with benefit for the foaming of many mechanically spumescent compositions. Many other foam-generating appliances are well suited to simultaneously manufacture the foam and direct it in a copious stream for deposit in the intended application thereof. By way of illustration, excellent foams may be generated by spraying the composition against a foraminulous barrier (such as a cloth or screen having a size of about 100 mesh in the U. S. Standard Sieve Series) through which a current or blast of air or other desired gas is being simultaneously and unidirectionally forced. Voluminous foam products may be made to issue and to be directed continuously from the downwind side of such a device by the obvious bubble generating action of the air blast which pushes and expands the enfilmed composition through the foraminula in the barrier. Apparatus of this type can be utilized with great advantage in conjunction with standard fumigating rigs and equipment so as to apply the foam blanket directly before or after release of the fumigant or other treating substance in the soil as the operation proceeds through sections or plots of soil being treated.

It is generally advantageous to form the blanket on the surface of the soil that is to be fumigated or otherwise treated with a spumous layer of the foam having an average minimum thickness of at least about one-tenth to one-quarter inch. Foam blanket thicknesses of at least about one inch may oftentimes be found to better ensure the desired results in many situations. In many cases a foam blanket of two to three inches may be preferable. Of course, the precise thickness of the foam layer that is best to employ depends to a great extent upon its particular confining efficacy and the fugacity of the substance being confined and to some extent upon such other influences as the wind, sun or other conditions in outdoor (or indoor) use which may exert a greater or lesser drying influence on the deposited foam. Foam having smaller individual average bubble sizes frequently tends to exhibit greater confining efficacy. It is usually unnecessary and impractical for the thickness of the foam blanket that has been applied as a confining cover to be in excess of about six inches. It is generally beneficial to utilize a relatively "tight," rigid and non-flowing foam for the confining blanket that consists of plural layers of component foam bubbles. The rigidity and coherence of an aqueous foam is often proportional to its particular "tightness" and the fineness of the individual bubbles of which it is composed. Other factors to be taken into account in determining optimum thickness of an applied foam blanket are the general surface contour of the soil being treated and the ability of the foam layer, in any given thickness, to maintain a continuous and efficiently confining blanket covering thereover.

The applied foam blankets eventually decay and collapse by means of drainage, bursting and desiccation. If a suitably durable foam has been employed, its dissipation will usually not occur until the desired effectiveness of the volatile treating agent has been achieved on the soil. Usually all that remains of the applied foam after its eventual demise is a dry, skeletal, foam lamellae or fluffy residue that does not interfere with the functions, processes or intended use of the soil. The residue is usually certain to be washed off by rains. Likewise, if desired and as has been mentioned, the residue can be purposely washed into the ground by watering after it has been applied and has afforded its confining influence for the volatile treating agent. Of course, it will be quite obvious that the practice of the present invention is poorly adapted for outdoor utilization during rainy or excessively wet weather.

In order to further exemplify the present invention, without intending to be limited to or restricted by the specific demonstrations therein set forth, the following illustrations are given:

FIRST ILLUSTRATION

A foam-providing composition was prepared by dissolving about 5.0 parts by weight of purified soaproot extract saponin and 10.0 parts by weight of "Methocel" brand methyl cellulose of the 10 centipoises (cps.) viscosity grade in 1000 parts by weight of water. The solution was prepared by adding the dry ingredients to about one-third the total volume of water which had been separately heated. After about five minutes, the balance of the water was added at room temperature with continued stirring to achieve complete solution. A very stable mechanical foam could be generated and directed for application from the spumescent solution by spraying it, in and through a duct, against a double layer of 100 mesh copper screen having a diameter of about one and three-eighths inches through which about 30 to 40 cubic feet per minute of air were being simultaneously forced by a high speed fan capable of producing a static pressure in a closed system equal to about a seventeen inch head of water.

Eight glazed crocks having a depth of about nine inches, a diameter of about eight inches and a volumetric capacity of about two standard U.S. gallons were each filled to within about three inches from their tops with a good quality loam potting soil. A pitch of each of the seeds for Japanese millet (*Echinochloa frumentacea* [*Roxb.*]), timothy (*Phleum pratense L.*), wild mustard (*Brassica arvensis L.*) and pigweed (*Amaranthus retroflexus L.*) was sowed in each of the crocks which were arbitrarily designated as being Crocks "A" through "H," inclusive. The scattered, intermixed seeds in each of the crocks were covered with a light layer of soil and watered in order to keep them moist for a forty-eight hour period. At the termination of this period, each of the crocks excepting Crocks "A" and "B" (which were used as controls) were fumigated by injecting about two milliliters of cold, liquid methyl bromide approximately two inches deep in the center of the soil that was contained in each crock. The soil temperature during the fumigation was between 70 and 80° F. This was equivalent to an application rate of about two pounds per hundred square feet of soil. Crocks "C" and "D" were left uncovered during and after the fumigation. Crocks "E" and "F" were tightly sealed with polyethylene film during and after the fumigation; the methyl bromide was injected through a small hole in the film cover into the soil, after which the film was resealed to ensure its confining efficacy. The soil surfaces in Crocks "G" and "H" were covered with about a three inch thick layer of the foam, prepared and spumed in the described fashion, during and after the fumigation. Approximately forty milliliters of the foam-providing solution was used to produce each layer of foam blanket in each of the Crocks "G" and "H." The methyl bromide was injected into the soil directly through the foam blanket. The applied foam blankets persisted for about eight hours after the injection before becoming dried out to a dry, fluffy residue which was ineffective for further confinement within the soil of the methyl bromide in Crocks "G" and "H." The polyethylene film covers were left intact upon Crocks "E" and "F" for about twenty-four hours after application of the methyl bromide.

After their fumigation, the crocks were maintained watered under greenhouse conditions for a period of about twenty-six days from their initial planting. At the end of this time, a lush and luxuriant growth of weeds had occurred in Crocks "A" through "D" inclusive, with little visible difference in the stands that had developed in the control crocks and the crocks that were uncovered during the fumigation. No weeds or other growth were observed in Crocks "E" and "F." Likewise, Crocks "G" and "H," which had been fumigated under foam in accordance with the present invention, were found to be essentially devoid of weed growth.

SECOND ILLUSTRATION

A gelatin foam was prepared and employed to confine methyl bromide in soil during fumigation. This foam was also compared as to its efficacy with a polyethylene film cover of the conventional variety used for confining fumigants. The gelatin foam was mechanically spumed from about 200 milliliters of a composition prepared according to the following recipe:

Gelatin _____grams__ 40
Methyl cellulose ("Methocel"-400 cps.), in 2 percent aqueous solution _____milliliters__ 50
Dioctyl sodium sulfocuccinate ("Aerosol OT"), in 2 percent aqueous solution _____milliliters__ 50
Glycerine _____do____ 10
Formaldehyde, in 40 percent aqueous solution _____milliliters__ 10
Water _____do____ 350

Four galvanized metal flats, each having dimensions of 4 inches by 13 inches by 19 inches, were employed in the tests. These flats were respectively designated "I," "J," "K" and "L." Each of the open top flats had completely sealed sides and bottoms so as to be air-tight. A quantity of a good loam potting soil, sufficient to about half fill the total volume of the four flats, was mixed uniformly with a liberal pinch between the fingers (approximately one to two grams per pinch so as to obtain approximately equal numbers) of each of the following seeds:

Japanese millet (*Echinochloa frumentacea* [*Roxb.*])
Pigweed (*Amaranthus retroflexus L.*)
Radish (*Rhaphanus sativus L.*)
Timothy (*Phleum pratense L.*)
Wild mustard (*Brassica arvensis L.*)

Each of the flats "I," "J," "K" and "L" was then filled to a depth of about 2 inches with the prepared, seed-containing potting soil. The volume of soil placed in each flat was about 494 cubic inches. Sufficient water for good seed germination was sprinkled on the soil in each flat. The flats were then set aside for about 24 hours in order for the seeds to take up adequate moisture to allow optimum control of the weed seeds with the fumigant. At the end of this time, flats "J," "K," and "L" were all fumigated with methyl bromide at the rate of about one pound per cubic yard of soil. The methyl bromide was injected into the soil using a composition containing about 24.5 weight percent of methyl bromide and 75.5 weight percent of xylene. The dose rate of the applied fumigant was about one pound of methyl bromide per cubic yard of soil, as obtained by injecting about 20 milliters of the fumigant composition into the soil in each of the flats.

Each of the flats were treated as follows:
Flat "I" was an unfumigated control.
Flat "J" was fumigated by injecting 20 milliliters of the methyl bromide-xylene composition into the soil to a depth of one inch in the center of the flat. Immediately after injecting the fumigant, about 400 milliliters of water was sprinkled uniformly on the surface of the soil to attempt to seal the fumigant therein.

The top of flat "K" was tightly sealed with polyethylene film and 20 milliliters of the methyl bromide composition was injected through the film into the soil to a depth of one inch in the center of the flat.

Flat "L" was fumigated by injecting 20 milliliters of the methyl bromide composition into the soil to a depth of one inch in the center of the flat. Immediately after injecting the fumigant, the soil was covered with a blanketing layer of gelatin foam having an average thickness of 2–3 inches.

The continuous gelatin foam blanket had individual cells of approximately 5 millimeters in diameter. It was applied over the entire surface of flat "L" by means of a mechanical bubbling technique. The foam blanket was carefully deposited so as to extend completely and continuously over the soil and to be in contact with all of the inner sides of the flat above the soil line. The foam was stable and dried with very little drainage. After drying, the foam remained in firm attachment to the sides of the flat.

After a fumigation period of about 48 hours, the polyethylene film and the dry gelatin foam covers were removed from flats "K" and "L," respectively. After removal of the covers and for the next several weeks, all four flats were watered as necessary for good seed germination and growth.

As is readily apparent and as can be appreciated by those who are skilled in the art, the degree of plant growth in each flat is a measure of the effectiveness of the fumigation. If the fumigation is completely effective, all seeds will be killed by the treatment and no plants will be growing in the soil. The degree of plant growth in each flat eleven days after removal of the film and foam covers from flats "K" and "L" is given in the following tabulation:

*Table I.—Degree of weed control obtained by methyl bromide fumigation using several different types of covers*

| Flat No. | Treatment and Cover | Degree of Weed Control |
|---|---|---|
| "I" | Unfumigated | None. Weeds growing profusely throughout flat. |
| "J" | 1 pound methyl bromide per cubic yard-water seal. | Approximately 20 percent control. No weeds in small area in center of flat but many weeds throughout rest of flat. |
| "K" | 1 pound methyl bromide per cubic yard-polyethylene cover. | 100 percent control. No weeds. |
| "L" | 1 pound methyl bromide per cubic yard-gelatin foam cover. | 100 percent control. No weeds. |

As is evident in the foregoing, there was no difference observed in the results obtained with the standard polyethylene cover and the foam cover. Both treatments gave about perfect control. Thus, the gelatin foam blanket secured excellent confinement of the highly fugacious fumigant in the soil during the fumigation period.

THIRD ILLUSTRATION

Several equal volume samples of soil having an average depth of about 30 inches were prepared from a sandy loam containing about 10 weight percent moisture and having about 30–35 percent by volume of air space in the soil. Each of the soil samples, designated "M" through "W," inclusive, contained an identical quantity of mixed rape and oat seeds (*Brassica napus L.* and *Avena sativa L.*, respectively). The seeds were mixed uniformly throughout the depth of the soil. Propargyl bromide was applied to each of the samples, either at the surface of the soil in the sample or at a depth of about three inches under the surface. A dose rate of about 40 pounds per square acre was utilized for each sample. The surfaces of the several samples were then covered at various intervals, before and after treatment, with varying thicknesses of relatively stable foam from a spumescent soap composition for varying periods of time, according to the following schedule:

checked for moisture content and re-watered. On the tenth day after treatment, they were observed for control of germination of the oat and rape seeds. The results obtained are shown in the following tabulation:

*Table II.—Control of oat and rape seed with propargyl bromide under confining foam blanket*

| Seed | Depth in inches | Percent control of seeds at different depths for various treatments in soil sample | | | | | | | | | | |
|---|---|---|---|---|---|---|---|---|---|---|---|---|
| | | "M" | "N" | "O" | "P" | "Q" | "R" | "S" | "T" | "U" | "V" | "W" |
| Rape | 3 | 0 | 100 | 100 | 0 | 60 | 95 | 0 | 100 | 100 | 0 | 0 |
| | 6 | 0 | 100 | 100 | 0 | 0 | 60 | 90 | 100 | 100 | 0 | 0 |
| | 9 | 0 | 90 | 100 | 0 | 0 | 0 | 0 | 100 | 100 | 0 | 0 |
| | 12 | 0 | 0 | 30 | 0 | 0 | 0 | 0 | 90 | 90 | 0 | 0 |
| | 15 | 0 | 0 | 0 | 0 | 0 | 0 | 0 | 0 | 0 | 0 | 0 |
| | 18 | 0 | 0 | 0 | 0 | 0 | 0 | 0 | 0 | 0 | 0 | 0 |
| | 21 | 0 | 0 | 0 | 0 | 0 | 0 | 0 | 0 | 0 | 0 | 0 |
| | 24 | 0 | 0 | 0 | 0 | 0 | 0 | 0 | 0 | 0 | 0 | 0 |
| | 27 | 0 | 0 | 0 | 0 | 0 | 0 | 0 | 0 | 0 | 0 | 0 |
| | 30 | 0 | 0 | 0 | 0 | 0 | 0 | 0 | 0 | 0 | 0 | 0 |
| Oats | 3 | 0 | 100 | 100 | 0 | 100 | 100 | 0 | 100 | 100 | 0 | 0 |
| | 6 | 0 | 100 | 100 | 0 | 0 | 90 | 90 | 100 | 100 | 0 | 0 |
| | 9 | 0 | 90 | 100 | 0 | 0 | 0 | 0 | 100 | 100 | 0 | 0 |
| | 12 | 0 | 0 | 30 | 0 | 0 | 0 | 0 | 90 | 90 | 0 | 0 |
| | 15 | 0 | 0 | 0 | 0 | 0 | 0 | 0 | 0 | 0 | 0 | 0 |
| | 18 | 0 | 0 | 0 | 0 | 0 | 0 | 0 | 0 | 0 | 0 | 0 |
| | 21 | 0 | 0 | 0 | 0 | 0 | 0 | 0 | 0 | 0 | 0 | 0 |
| | 24 | 0 | 0 | 0 | 0 | 0 | 0 | 0 | 0 | 0 | 0 | 0 |
| | 27 | 0 | 0 | 0 | 0 | 0 | 0 | 0 | 0 | 0 | 0 | 0 |
| | 30 | 0 | 0 | 0 | 0 | 0 | 0 | 0 | 0 | 0 | 0 | 0 |

| Soil Sample | Treatment Description |
|---|---|
| "M" | No foam applied, propargyl bromide applied at surface of the soil. |
| "N" | ¼ inch of foam applied, propargyl bromide injected through the foam at the surface of the soil. |
| "O" | ½ inch of foam applied, propargyl bromide injected through the foam at the surface of the soil. |
| "P" | 1 inch of foam applied, propargyl bromide injected through the foam at the surface of the soil, foam layer removed after 1 hour. |
| "Q" | 1 inch of foam applied, propargyl bromide injected through the foam at the surface of the soil, foam layer removed after 2 hours. |
| "R" | 1 inch of foam applied, propargyl bromide injected through the foam at the surface of the soil, foam layer removed after 4 hours. |
| "S" | No foam applied, propargyl bromide injected 3 inches deep in the soil. |
| "T" | Propargyl bromide injected 3 inches deep in the soil, 1 inch of foam applied 15 minutes after injection of propargyl bromide. |
| "U" | Propargyl bromide injected 3 inches deep in the soil, 1 inch of foam applied 3 minutes after injection of propargyl bromide. |
| "V" | 1 inch of foam applied to the surface of the soil, propargyl bromide not applied. |
| "W" | No foam or propargyl bromide applied to soil. |

The foam employed was a commercially available self-foaming shaving soap generated and applied from a conventional aerosol bomb-type dispenser. The density of the dispensed and expanded foam product was about 0.1 gram per cubic centimeter. The foamable shaving soap composition ("Mennen's Foam Shave"), after the removal of the gaseous propellant and water, contained about 18.7 weight percent of total solids. These solids were a mixture of lanolin with 20–25 weight percent of the diethanolamine salt of palmitic and stearic acids and a small quantity (less than 1 weight percent) of a water-soluble polyethylene glycol ester.

Each of the soil samples was incubated for seven days at 70° F. On the eighth day, the samples were As is evident in the foregoing, samples "M," "V" and "W" indicate that there is no weed control if (1) propargyl bromide is applied at the surface, (2) foam is applied at the surface, and (3) neither of them are applied.

Comparison of the treatments on samples "M," "N" and "O" indicate that as little as a one-quarter inch or less thickness layer of the foam blanket is required to insure effective control of weed seeds in the surface layers of soil by propargyl bromide.

Comparison of samples "M," "P," "Q" and "R" shows that the foam need last no more than about two hours in order to obtain a degree of weed control at the surface of the soil.

Comparison of samples "S," "T" and "U" indicates that the foam can be applied to the soil as long as 15 minutes after fumigant application and still give much improved control over weed seeds in the surface of the soil.

When the foregoing techniques are employed, excepting to use even deeper injections of the fumigants in the soil, even longer intervals of time can be permitted to elapse before it is necessary to cover the treated soil with the foam blanket. In addition, foam coverings can be employed with advantage for controlling organisms at the surface of the soil even in instances when the fumigant is placed as deep as 12 inches or more in the soil. This, of course, permits even longer periods of time to elapse between release of the fumigant and application of the foam blanket.

Results similar to the foregoing may be observed when the invention is practiced with other fumigants and other volatile or fugacious liquid soil treating or conditioning agents using the same or variations of the same foam blankets for confining the volatile substances within the soil or when other adaptable cellulose ether derivatives or polyvinylalcohol or other suitable polymeric substances, including other proteinous and other soap or detergent materials, are utilized in and for the foam-providing compositions and the foam generated therefrom.

Certain changes and modifications in the present invention can obviously be made in its practice without departing substantially from its intended spirit and scope. As a consequence, the invention is not intended to be limited or otherwise restricted to or by the convenient and preferred embodiments thereof with which the foregoing description and specification are illustrated, Rather, it is to be interpreted and construed in the light of what is set forth and defined in the hereto appended claims.

What is claimed and desired to be secured by Letters Patent is:

1. Method which comprises confining a volatile soil treating substance that is released in soil being treated therewith under and by means of a blanket of a stable, long-lasting foam covering the surface of the soil, which foam blanket has an average layer thickness of at least about one-quarter inch and a longevity of at least about one hour and which has been generated from an aqueous, spumescent, foam-providing composition.

2. The method of claim 1, wherein the layer of foam has a thickness of at least about an inch.

3. The method of claim 1, wherein the longevity of the foam is at least about four hours.

4. The method of claim 1, wherein the volume of the foam is at least about 10 times the volume of the composition from which it was generated.

5. The method of claim 1, wherein the foam is generated from an aqueous, proteinous, foam-providing composition.

6. The method of claim 1, wherein the foam is generated from an aqueous, foam-providing soap composition.

7. The method of claim 1, wherein the foam is generated from an aqueous foam-providing composition that contains a water-soluble polymeric material which is mechanically spumiferous in aqueous solution.

8. The method of claim 1, wherein the foam is generated from a dilute aqueous solution of a long-chain, water-soluble polymeric material selected from the group consisting of non-polar cellulose ether derivatives that are adapted to provide one percent by weight aqueous solutions having surface tensions at room temperatures beneath about 60 dynes per centimeter; polyvinyl alcohol, polyvinylpyrrolidone; water-soluble copolymers of vinyl pyrrolidone; hydrolyzed polyacrylonitrile; copolymers of vinyl acetate and maleic acid; copolymers of vinyl methyl ether and maleic anhydride; and mixtures thereof; said aqueous solution containing a minor proportion of saponin.

9. A method in accordance with the method set forth in claim 8, wherein the foam is generated from a dilute aqueous solution containing between about 0.05 and 10 percent by weight of the saponin and 0.25 and 5.0 percent by weight of the polymeric material, both based on the weight of the solution.

10. A method in accordance with the method set forth in claim 9, wherein the foam is generated from a methyl ether of cellulose having a viscosity less than about 100 centipoises.

11. The method of claim 1, wherein the volatile substance that is released is methyl bromide fumigant.

12. The method of claim 1, wherein the volatile substance that is released is ethylene dibromide.

13. The method of claim 1, wherein the volatile substance that is released is chloropicrin.

14. The method of claim 1, wherein the volatile substance that is released is comprised of dichloropropenes.

15. The method of claim 1, wherein the volatile substance that is released is 1,2-dibromo-3-chloro-propane.

16. The method of claim 1, wherein the volatile substance that is released is propargyl bromide.

17. The method of claim 1, wherein the soil to be treated is first covered with said blanket layer of stable foam after which said volatile treating substance is released into the soil through and under the covering and confining foam blanket during the life of said foam.

18. The method of claim 1, wherein said volatile soil treating substance is first released into the soil to be treated after which said treated soil is covered with said blanket layer of stable foam while a substantial and effective portion of said volatile treating substance remains in said soil.

19. The method of claim 18, wherein said blanket layer of foam is applied to cover said treated soil within a period of about four hours after release of said volatile treating substance into the soil.

20. The method of claim 18, wherein said blanket layer of foam is applied to cover said treated soil about immediately after release of said volatile treating substance into the soil.

No references cited.